United States Patent [19]

Atkinson et al.

[11] Patent Number: 4,534,922

[45] Date of Patent: Aug. 13, 1985

[54] GASKETS

[75] Inventors: Alan W. Atkinson, Rochdale; Katryna J. Dearden; Janet M. Lancaster, both of Littleborough, all of England

[73] Assignee: T&N Materials Research Limited, Manchester, England

[21] Appl. No.: 536,975

[22] Filed: Sep. 29, 1983

[30] Foreign Application Priority Data

Oct. 1, 1982 [GB] United Kingdom ............... 8228155

[51] Int. Cl.³ .............................................. D04H 1/54
[52] U.S. Cl. ................................... 264/119; 156/209; 264/284; 264/293; 425/446; 428/133; 428/408
[58] Field of Search ...................... 264/119, 284, 293; 428/133, 408; 425/446; 156/209

[56] References Cited

U.S. PATENT DOCUMENTS

| 2,904,844 | 9/1959 | Smithies | 264/284 |
| 2,992,151 | 7/1961 | Niessen | 428/133 |
| 3,404,061 | 10/1968 | Shane et al. | 428/408 |
| 3,816,180 | 6/1974 | Curelop | 264/119 |
| 3,914,490 | 10/1975 | Fusiek | 428/133 |
| 4,180,211 | 12/1979 | Olcott et al. | 428/408 |
| 4,201,804 | 5/1980 | Stecher et al. | 428/133 |
| 4,234,638 | 11/1980 | Yamazoe et al. | 264/112 |
| 4,325,899 | 4/1982 | Cole et al. | 264/119 |
| 4,422,894 | 12/1983 | Atkinson et al. | 428/408 |
| 4,435,235 | 3/1984 | Atkinson et al. | 264/517 |

FOREIGN PATENT DOCUMENTS 2646832  4/1978  Fed. Rep. of Germany.

Primary Examiner—Jeffery Thurlow
Assistant Examiner—Patrick Dailey
Attorney, Agent, or Firm—Cushman, Darby & Cushman

[57] ABSTRACT

Graphite gaskets with an improved release characteristic are pressed (to reduce their void content) and then embossed with a pattern of relatively raised areas surrounded by interconnected depressions.

9 Claims, No Drawings

GASKETS

TECHNICAL FIELD OF THE INVENTION

This invention relates to gaskets exhibiting improved release characteristics after use in a joint between mating parts. In particular it relates to gaskets made from flakes of expanded graphite.

Gaskets and in particular cylinder head gaskets, should ideally be readily removable on dismantling the joints in which they have been used, even after long service. However, many gasket materials and especially graphite tend to adhere very firmly to the mating faces of a joint. Graphite gaskets for example both adhere very firmly and tend to de-laminate easily after use, leaving large amounts of graphite adhered to one or both faces of the joint. Before the joint can be made good again, with a new gasket, the mating faces have to be cleaned by scraping off the adherent material, with the attendant risk of dislodged material entering passageways through the component parts of the joint, such as oil and/or waterways. Scraping may also cause mechanical damage to the joint faces.

THE PRIOR ART

Adhesion of gasket materials is an old problem. Various solutions have been proposed, including the use of release agents such as mica, aluminium powder, talc, soaps, soapstone, ptfe, silicone rubbers and varnishes. Apart from the ephemeral nature of powder treatments and the easily-abraded character of silicone rubber layers on graphite, there are also the effects of temperature, pressure and time to consider. Considerable temperature variations exist in a cylinder head assembly for example. In the case of graphite, none of the known release treatments is particularly effective, especially for cylinder head gaskets.

BRIEF DESCRIPTION OF THE INVENTION

According to the present invention a method of making a graphite gasket includes the steps of pressing and then embossing to form a pattern comprising relatively raised areas surrounded by predominantly interconnected depressions.

PREFERRED FEATURES OF THE INVENTION

The pressing step is preferably carried out cold, i.e. at ambient temperature. It is preferably applied to a relatively low density gasket preform, so as to reduce the void content of the graphite. However, the pressing step may equally well be that used to make the gasket/preform directly from graphite flakes.

Embossing for the purposes of this specification is the formation of a relief pattern comprising raised areas, or islands, surrounded by predominantly interconnected, depressed regions. This can be accomplished by pressing the graphite against a woven monofilament cloth or against an expanded metal mesh. Press platens or embossing rollers may also be used to develop the desired relief pattern.

One form of embossing of gasket material is known from German patent publication OLS No. 2646832. However, that document is concerned with forming relatively soft interconnected raised portions and hard isolated depressed regions over the face of a gasket in order to provide sealing regions and stress-resisting regions, respectively. This particular embossing treatment for graphite cylinder head gaskets has been found to be ineffective as regards release performance after service.

It has been found that the combination of pressing, and embossing in the manner of the invention gives better release performance in a cylinder head gasket than does any of the prior proposals.

DESCRIPTION OF A PREFERRED EMBODIMENT

In order that the invention be better understood a preferred embodiment of it will now be described with reference to the following example.

EXAMPLE

Exfoliated (expanded) graphite flakes of density 4 kg/m$^3$ were lightly pressed to give a sheet preform of density 30 kg/m$^3$ at a thickness of 20 mm. The preform was repeatedly passed through cold calender rolls (at room temperature) the calender nip being progressively reduced in 1.5 mm steps to develop a final graphite density of 1500 kg/m$^3$ at a thickness of 0.4 mm. Six to ten passes of the calender were needed for this. The sheet product was then covered on each face with a piece of woven polyester monofilament bolting cloth (0.15 mm monofilaments 0.4 mm apart) and passed through a roller nip. Platen pressing at 7 MPa (1000 psig) was equally effective to emboss into the graphite surface the weave pattern, forming a network of interconnected depressed regions.

TEST PROCEDURE

The product was tested in a laboratory test rig comprising two thick discs of cast iron and aluminium, respectively, clamped together by means of a nut and bolt. The mating faces were machined to a finish of 50 um and were thinly coated with ordinary engine oil prior to use. A sample of the treated graphite sheet was clamped between the discs at 1500 psig ($1.055 \times 10^{-2}$ kg/m$^2$.) The rig was placed into an oven and held at a test temperature of 150° C. After 25 hours, it was removed from the oven and allowed to cool naturally before unbolting the assembly and separating the discs to see how much (if any) graphite had adhered to each of them. Untreated graphite adheres totally and completely delaminates in this test. Graphite treated according to the invention released much more readily. This was confirmed in a further test conducted at 550° C.

We claim:

1. A method of making a gasket having improved release characteristics for use in a joint between mating pairs, the gasket made from exfoliated graphite by a process comprising the steps of:
   (1) forming a gasket from exfoliated graphite particles,
   (2) pressing the gasket thus formed, and thereafter
   (3) embossing the gasket by pressing against surface means having a profile such that the substrate pressed is given a pattern of relatively raised areas surrounded by predominantly interconnected depressions distributed uniformly over the gasket surfaces, the raised areas being spaced apart from each other so as to provide improved release characteristics from the mating parts.

2. The method of claim 1 wherein the pressing step is carried out at ambient temperature.

3. The method of claim 1 wherein the gasket is formed from a relatively low density graphite preform so as to reduce the void content of the exfoliated graphite.

4. The method of claim 1 wherein the embossing step is carried out by pressing against a woven fabric or against an expanded metal mesh.

5. The method of claim 1 wherein the embossing step is carried out by pressing against a woven monofilament cloth.

6. The method of claim 1 wherein the embossing step is carried out by means of embossing rollers or press platens.

7. A graphite gasket having improved release characteristics and a pattern of relatively raised areas surrounded by predominantly interconnected depressions made by the method of claim 1.

8. The method of claim 1 wherein the gasket is formed directly from particles of exfoliated graphite.

9. In a method of making a gasket for use between mating parts by a process comprising the steps of forming the gasket from exfoliated graphite particles, the improvement comprising:
  (1) pressing said gasket, and thereafter
  (2) subjecting it to an embossing treatment by pressing against surface means having a profile such that the substrate pressed is given a uniform network of relatively raised areas surrounded by predominantly interconnected depressions distributed uniformly over the gasket surfaces, the raised areas being spaced apart from each other so as to provide improved release characteristics from said mating parts after use.

* * * * *